US007247778B2

(12) United States Patent
Chase et al.

(10) Patent No.: US 7,247,778 B2
(45) Date of Patent: Jul. 24, 2007

(54) ADDRESSABLE PNEUMATIC VALVE SYSTEM

(76) Inventors: Spencer Chase, 67550 Bell Springs Rd., Garberville, CA (US) 95542; Eugene Peter Gerety, 7 Deer Run Dr., Seymour, CT (US) 06483

( * ) Notice: Subject to any disclaimer, the term of this patent is extended or adjusted under 35 U.S.C. 154(b) by 180 days.

(21) Appl. No.: 10/930,341

(22) Filed: Aug. 30, 2004

(65) Prior Publication Data

US 2005/0188811 A1 Sep. 1, 2005

Related U.S. Application Data

(60) Provisional application No. 60/498,971, filed on Aug. 29, 2003.

(51) Int. Cl.
*F16K 15/02* (2006.01)

(52) U.S. Cl. ....................... 84/6; 84/60; 84/89; 84/338; 84/342; 84/388; 137/597

(58) Field of Classification Search ...................... 84/3, 84/6, 19–25, 48–51, 59–63, 89, 107, 110, 84/114, 337–342, 347, 388–389, 687, 688; 137/597

See application file for complete search history.

(56) References Cited

U.S. PATENT DOCUMENTS 5,203,368 A * 4/1993 Barstow et al. ............. 137/240
5,320,139 A * 6/1994 Paul et al. ............. 137/565.33
5,722,646 A * 3/1998 Soderberg et al. ............ 269/20
5,897,097 A * 4/1999 Biegelsen et al. ..... 251/129.01
6,209,188 B1 * 4/2001 Soderberg et al. ............ 29/559
6,408,878 B2 * 6/2002 Unger et al. ................ 137/597
6,866,233 B2 * 3/2005 Patel et al. ................. 244/204
6,971,404 B2 * 12/2005 Simmons, Jr. ............. 137/538

* cited by examiner

*Primary Examiner*—Gary F. Paumen
(74) *Attorney, Agent, or Firm*—Eugene P. Gerety

(57) ABSTRACT

An addressable valve system is described wherein a plurality of valves are embedded into a single, compact valve block. Each valve comprises a piston moving in a bore in the block. A magnet embedded in the piston is positioned within a coil. When energized, the coil attracts the magnet and the plunger upwards away from a valve seat. Magnetic shields disposed between the pistons provide magnetic isolation between the pistons and simultaneously apply a closing force to the pistons by drawing the magnets downward towards the valve seat. When energized, the coils overwhelm the closing force and open the valves. Electronics for the valve block and the coils are provided on a circuit board overlying the pistons and bores. The electronics provide addressability of the valves and automatically generate "pick" and "hold" timing whereby the initial motivating force (voltage) applied to the current is higher to get the valves moving quickly when valve is first commanded to open. After a brief period of time, the coil voltage is lowered to a level that provided a lower maintaining force to keep the valve open.

10 Claims, 4 Drawing Sheets

ADDRESSABLE PNEUMATIC VALVE SYSTEM

CROSS-REFERENCE TO RELATED APPLICATIONS

This application claims the benefit of U.S. Provisional Patent Application No. 60/498,971 filed on Aug. 29, 2003, which is incorporated herein by reference.

TECHNICAL FIELD

The present invention relates generally to pneumatic valve systems, and more particularly to pneumatic "signal-level" control valves.

BACKGROUND ART

Many mechanical musical instruments, such as player pianos, orchestrions, nickelodeons, band organs, fariground organs, etc., employ a vacuum-operated "tracker bar" for operating musical instruments. Typically, such musical instruments employ perforated paper or paper-like rolls, wherein perforations in the roll effectively encode a musical performance.

The perforations in the paper rolls are arranged into "tracks" or columns, each column corresponding to an appropriately positioned opening in a tracker bar, over which the paper is passed. The openings in the tracker are positioned to align with corresponding "tracks" in the paper roll. The paper roll is fed from a supply spool to a takeup spool, passing over the tracker bar along the way. Typically, each opening in the tracker bar is connected via a signal tube to a control port on a pneumatic valve. In response to perforations in the paper roll, each valve controls a different function. Some valves cause notes to play. Other valves perform functions such as setting expression levels, operating a damper pedal, a soft pedal, or causing the paper roll to rewind.

Original paper music rolls for instruments of the type described above are typically between 60 and 100 years old. Many have deteriorated sufficiently that they can no longer be played. Only a limited selection of newer "recut" rolls is available. Many of the rolls considered best by collectors are the ones that have received the most play, and are therefore in the worst condition.

Recently, considerable effort has been expended in capturing and storing the patterns of perforations on music rolls in digital form on computer-readable media. This has generally been accomplished by means of electrical, pneumatic or optical scanning devices that "read" the perforation patterns on the rolls. As a result, roll performances that might otherwise be lost have been preserved on computer media.

A natural outgrowth of the combined availability of roll performances in digital form and the lack of availability of rolls in good condition has been an interest in adapting pneumatically-operated tracker-bar based instruments to play under computer control, with digital computer equipment providing electrical signals corresponding to perforations in the music rolls to a system of electrically operated pneumatic valves that interface to the signal tubing in a pneumatically operated instrument, effectively mimicking the behavior of a perforated paper roll passing over a tracker bar.

There are several problems with such systems:

1) Most solenoid operated valves were not designed for the high repetition rates and highly variable vacuum levels required by mechanical musical instruments. As a result, they tend to perform poorly in musical applications.

2) Most solenoid operated valves, including organ valves, are relatively large compared to the tiny signal tubes in most pneumatic musical instruments, and space in those musical instruments is often very scarce.

3) A typical player or reproducing piano requires anywhere from 90-100 valves. When individual solenoid valves are employed, the wiring is quite bulky and cumbersome.

4) Depending upon the types of valves used, their mounting, etc, such valve systems can be quite noisy, creating "clicking" noises loud enough to interfere with the music produced by the musical instrument.

Some attempts have been made to interface directly to the tracker bar of the instrument, opening and closing the "ports" of the tracker bar directly by connecting solenoid valves thereto. Unfortunately, the tracker bar port is usually the smallest passage in the pneumatic signal path to the control ports of the valves of the mechanical musical instrument. By creating an even longer path to the valve control ports in the musical instrument and by placing the most restricted part of the pneumatic signal path in the middle of this extended path (i.e., the tracker bar opening itself) considerable flow restriction can be experienced in attempting to operate the instrument, and performance (e.g., response time, repetition rate, etc.) can suffer.

SUMMARY OF THE INVENTION

It is therefore an object of the present invention to provide a system of electronically controlled valves capable of operating a pneumatic musical instrument.

It is a further object of the present invention to provide a high-performance pneumatic valve, capable of operating a high repetition rates (e.g., greater than 20 Hz) and over a wide range of vacuum levels.

It is a further object of the present invention to provide a system of electronically controlled valves wherein a large number (100 or more) of valves can be controlled while minimizing wiring complexity.

BRIEF DESCRIPTION OF THE DRAWINGS

These and further features of the present invention will be apparent with reference to the following description and drawing, wherein.

DETAILED DESCRIPTION OF THE INVENTION

Figure 1:
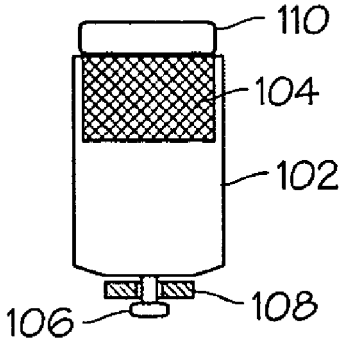
FIG. 1 is view of a piston assembly for a electrically operated pneumatic valve, according to the invention.

FIG. 1 is a cross-sectional diagram of a piston assembly for an electrically operated pneumatic valve, according to the invention. A cylindrical piston 102 has a magnet 104 fitted into a recess at one end thereof. The magnet is secured in place by gluing, crimping, interference fit or by any other suitable method. A small, button-head post 106 at an other end of the cylindrical piston 102 retains a valve seal punching 108. A cushion bumper 110 is affixed to the magnet end of the piston assembly. Preferably, the cylindrical piston 102 is made of aluminum; the magnet 104 is a neodymium magnet; the valve seal punching 108 is a silicone rubber washer and the cushion bumper is made of soft, but resilient material that produces minimal noise (e.g., "slapping") when struck.

Figure 2:
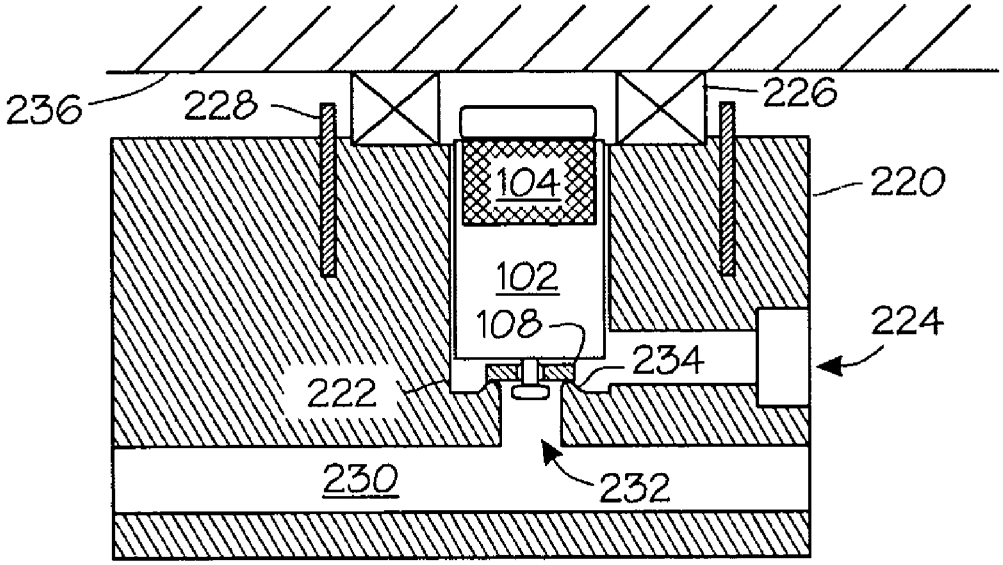
FIG. 2 is a cross-sectional view of an electrically operated pneumatic valve, according to the invention.

FIG. 2 is a cross-sectional view of an electrically-operated valve assembly, according to the invention. A valve body 220 has a bore 222 formed therein for receiving the piston described above. The piston fits loosely within the bore 222. The "loose" fit permits some motion of the piston to accommodate a good "fit" between the valve seal punching 108 and a raised valve seat 234 at the bottom of the bore 222. A vent opening 224 extends from the outside of the valve body 220 into the bore. A ring-shaped coil 226 is disposed at the top of the bore 222. The length of the piston, the vertical position of the magnet 104 and the position of the coil are all chosen so that when an electrical current is passed through the coil, magnetic attraction between the magnet and a magnetic field produced by the coil causes the piston to be pulled upwards. Ferromagnetic shields 228 on either side of the piston serve dual purposes: 1) They "shunt" magnetic flux, thereby preventing magnetic interaction with any neighboring pistons (e.g., in a closely-spaced multi-valve assembly) and 2) They are positioned such that the magnet 104 is attracted downwards when the coil 226 is not energized (i.e., when no current is passing through it), thereby forcing the piston downwards and providing a positive sealing force. When energized, the coil produces an upward pull on the magnet that overwhelms the closing force, pulling the piston upwards.

An opening 232 in the valve seat 234 extends downward into a cross-drilled signal hole 230. When the piston is in the "down" or "rest" position, the valve seal punching 108 rests on the valve seat 234, keeping the opening 232 in the valve seat closed, and the cross-drilled signal hole is isolated from the vent opening 224. When the piston is in the "up" or "raised" position, the valve seal punching 108 is lifted away from the valve seat 234, causing the cross-drilled signal hole 230 to be in pneumatic communication with the vent opening 234 via the opening 232 in the valve seat 234. A top surface 236 (preferably a circuit board to which the coil 226 is attached) acts as a "stop" for the piston.

The relative sizes and positions of the piston, the magnet 104 and the shields 228, and the strength of the magnet 104 are all chosen so that the closing force is greater than the weight of the piston. This allows the valve to be operated in any orientation, even upside-down. Since the force due to passive magnetic attraction between the magnet and the shields is greater than the weight of the piston, the valve is held closed even when the valve assembly is inverted.

Figure 3A:
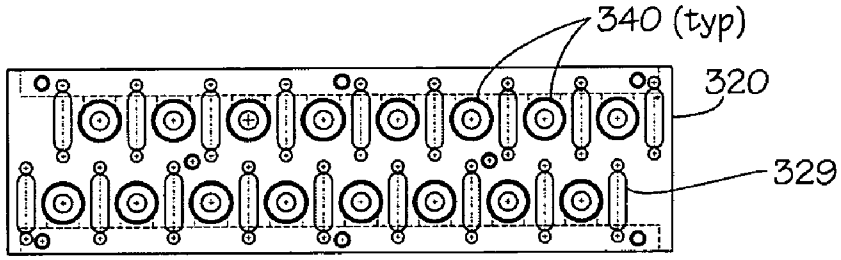
FIG. 3 is a diagram of a valve body for an assembly of 16 electrically operated valves, according to the invention.
Figure 3B:
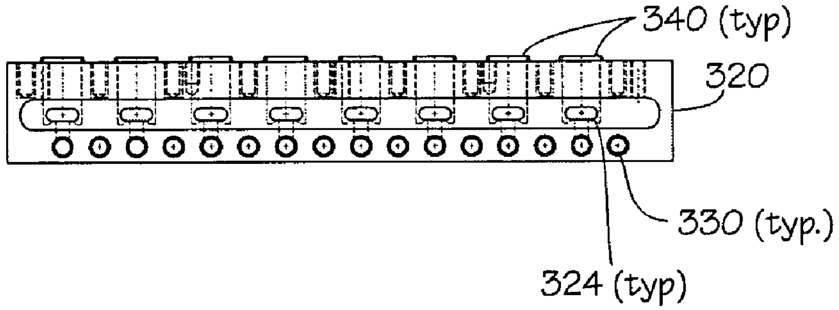
Figure 3C:
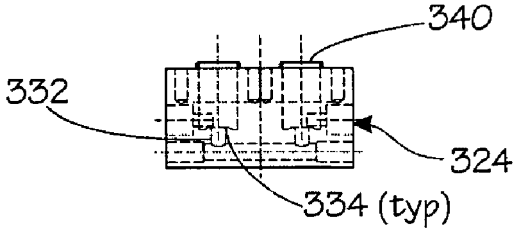

FIG. 3 is a drawing of a valve body 320 (compare 220) for an assembly of 16 electrically operated valves of the type described above. Specific features of the valve body 320 are vent openings 324 (compare 224), cross-drilled holes 330, valve seats 324, and alignment collars 340. The alignment collars 340 are intended to fit inside the ring-shaped coils (see 226) to assist in aligning them to the valve body 320. Preferably, the valve body is Delrin or other similar material.

Figure 4:
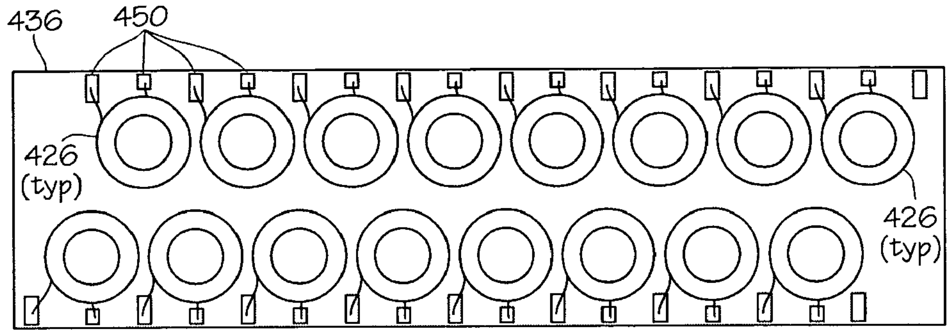
FIG. 4 is a view of a circuit board assembly including 16 coils for an assembly of 16 electrically operated valves, according to the invention.

FIG. 4 is a view of a circuit board assembly to which 16 ring-shaped coils 426 (compare 226) are mounted. The coils 426 are positioned to align with the alignment collars 340 of the valve body when the circuit board is assembled thereto. Each coil 426 has leads that attach to contacts 450 on the circuit board. These contacts 450 connect the coils to coil drive circuitry on the circuit board, described in greater detail below.

Figure 5:
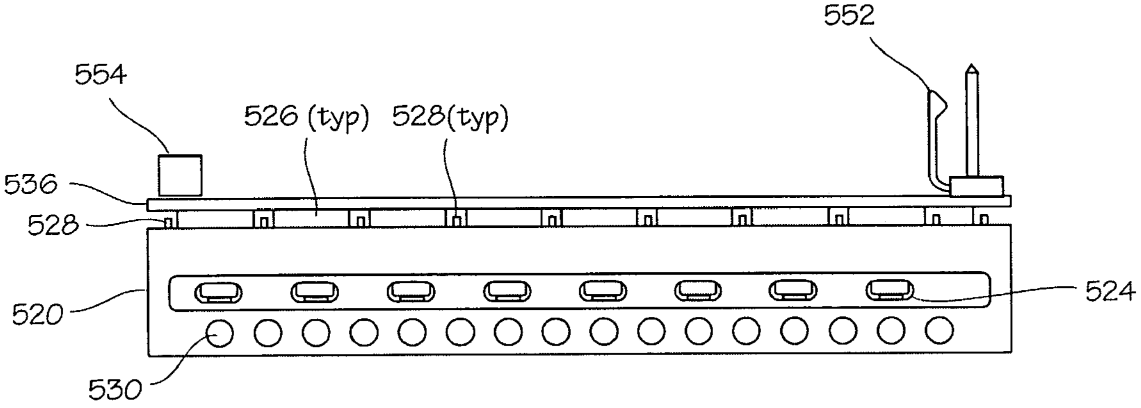
FIG. 5 is a view of an electrically operated 16-valve assembly, according to the invention.

FIG. 5 is a view of a complete assembly of 16 electrically operated valves. A circuit board 536 (see FIG. 4) has coils 526 mounted to a bottom surface thereof. Each coil aligns to an alignment collar on an appropriately formed valve body 524. Ferromagnetic shields 528 (compare 228) are inserted into the valve body and provide the dual function of preventing magnetic interaction between the valves and providing closing force for the valves (as described hereinabove).

A data connector 554 connects control signals from an external source to the circuit board 536. A power connector 552 connects power to the circuit board and provides the source of electrical energy for operating the valves.

Figure 6:
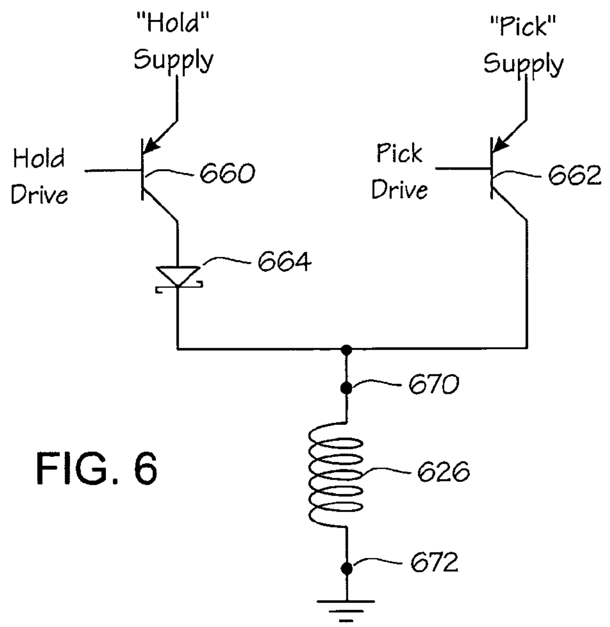
FIG. 6 is a schematic diagram of a "pick and hold" circuit of an electrically operated valve, according to the invention.

FIG. 6 is a schematic diagram of a "pick and hold" driver circuit for energizing a coil 626 (compare 226, 426, 526) of an electrically operated valve, according to the invention. One terminal 672 of the coil 626 is connected to ground. Another terminal 670 is connected to a junction between a collector terminal of a "pick" transistor 662 (a PNP driver transistor) and a cathode end of a diode 664 (preferably a Schottky diode). An anode end of the diode 664 connects to a collector terminal of a "Hold" transistor 660 (another PNP driver transistor). An emitter terminal of the "Hold" transistor connects to a "Hold" supply voltage (e.g., 5 volts), while an emitter terminal of the "Pick" transistor connects to a (preferably higher) "Pick" supply (e.g., 12V). A hold drive signal controls the "Hold" transistor 660 via its base terminal and a pick drive signal controls the "Pick" transistor 662 via its base terminal. In operation, both the pick and hold transistors (662 and 660) are turned on at the same time. Since the "pick" voltage is higher than the "hold" voltage, the diode 664 is reverse biased and the "pick" supply is applied across the coil 626. After a short time (typically a few milliseconds) the pick transistor is turned off, but the hold transistor is left on.

In this scenario, the application of the pick voltage gives the coil an initial "kick" that gets the valve moving quickly. Then the voltage across the coil is reduced to the "hold" voltage by turning the "pick" transistor off. The hold voltage keeps the valve open, while the pick voltage gives it rapid response. Additionally, by using a lower "hold" voltage, power dissipation (and hence heat build-up) are minimized. To close the valve, the hold transistor is turned off.

Figure 7:
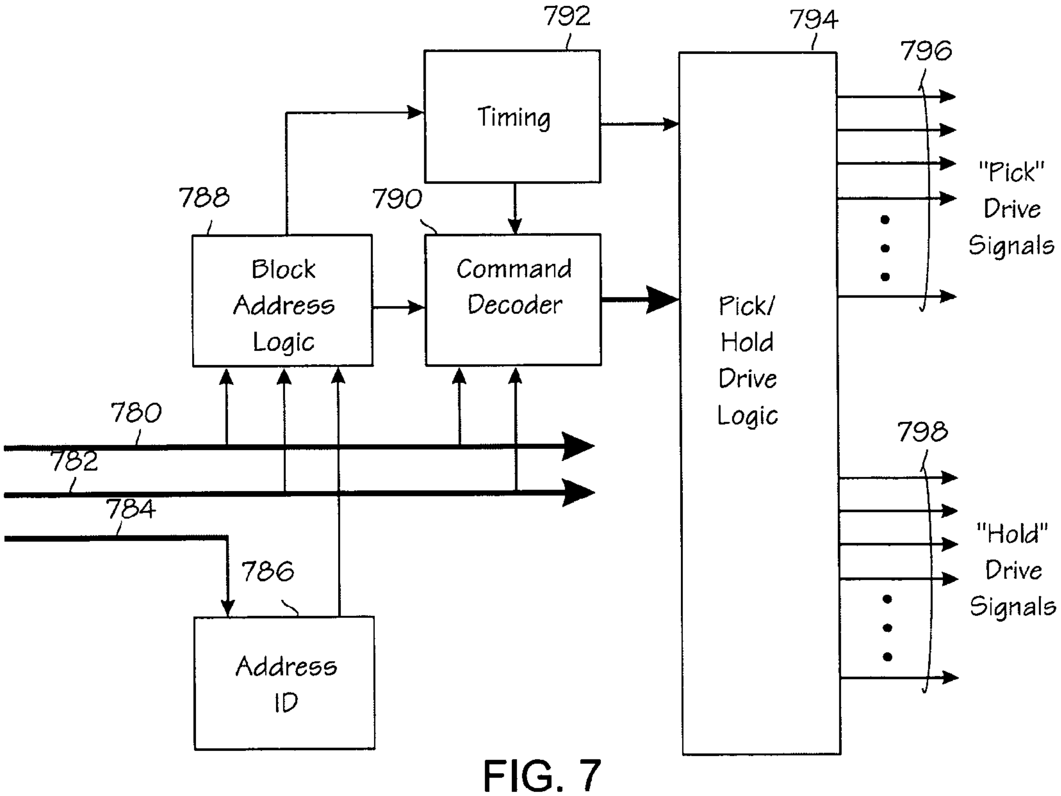
FIG. 7 is a block diagram of control logic for controlling a plurality of electrically operated valves, according to the invention.

FIG. 7 is a block diagram of a circuit board (see FIG. 4,5) for controlling an assembly of electrically operated pneumatic valves, according to the invention. Data signals 780, address/control signals 782, and an ID signal 784 control the operation of the valves. An Address ID block 786 uniquely identifies the valve block assembly and allows it to be addressed in isolation of any others. A "Silicon Serial Number chip", such as Dallas Semiconductor Silicon Serial Number IC DS2405, an address switch or any other suitable means, can provide this function. The Address ID block 786 is addressed, allowing block address logic 788 to be programmed so that the circuit will respond to a specific address (which can be assigned dynamically). Once a block address is assigned, the address/control signals 782 and data signals 780 are used in combination to issue commands to the valve block assembly via the command decoder 790. A timing block 792 provides timing reference for the pick/hold operation of the valve assembly. Some of the commands that can be issued to the command decoder are "Open valve "n" on this block", Close valve "n" on this block, Set pick duration to "n" milliseconds, Reset, turn all valves off, etc., etc.

The command decoder sends valve on/off signals to the pick/hold drive logic 794, which produces appropriately times pick/hold signals 796/798 to operate driver circuits of the type shown in FIG. 6.

Those of ordinary skill in the art will immediately recognize that many essentially equivalent variations on this scheme are possible. For example, polarities can be reversed with appropriate adaptations to the system. By way of further example, the valve piston could be other than cylindrical; the magnet location could be changed with appropriate adaptations to other components; the bumper could be applied to the striking surface rather than to the piston; and the valve seal could be at bottom of the bore instead of mounted to the piston. These and other similar adaptations are fully within the spirit and scope of the present inventive technique.

By means of the addressing system shown and described hereinabove, a large number of valve blocks can be "daisy-chain" connected via a common data cable. The addressing scheme allows the blocks to be individually identified, selected and controlled. In the case of a "Silicon Serial Number", each circuit board has a unique address that can be discovered by "searching" the cable to identify all connected serial number chips. This effectively enumerates the connected valve blocks. After identifying the number of blocks and their IDs, the blocks can be accessed via those IDs, one at a time, and programmed to respond to a particular address. Alternatively, an address switch scheme can be used whereby the address switch sets the address by which the block is addresses.

Although the invention has been shown and described with respect to a certain preferred embodiment or embodiments, certain equivalent alterations and modifications will occur to others skilled in the art upon the reading and understanding of this specification and the annexed drawings. In particular regard to the various functions performed by the above described components (assemblies, devices, circuits, etc.) the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of the invention may have been disclosed with respect to only one of several embodiments, such feature may be combined with one or more features of the other embodiments as may be desired and advantageous for any given or particular application.

What is claimed is:

1. An addressable pneumatic valve system, comprising:

at least one valve block embodying a plurality of pneumatic valves, each valve being electrically controllable to open an air passageway to a vent channel;

means for electrically identifying (ID) the valve block;

means for addressing the valve block;

means for activating individual ones of the pneumatic valves on the valve block; and pick and hold means for applying an initial strong motivating force to the valves for a predetermined period of time, then lowering the motivating force to a less strong maintaining force.

2. An addressable pneumatic valve system, comprising:

at least one valve block embodying a plurality of pneumatic valves, each valve being electrically controllable to open an air passageway to a vent channel;

means for electrically identifying (ID) the valve block;

means for addressing the valve block;

means for activating individual ones of the pneumatic valves on the valve block; and for each pneumatic valve, shield means for providing a closing force to the valve and for preventing magnetic interaction between the valves.

3. An electrically operated pneumatic valve, comprising:

a valve body, said valve body having a bore and a seat;

a vent opening extending from outside the valve body into the bore;

a piston disposed within the bore;

a magnet fitted within the piston;

shield means for providing a closing force to the valve;

a coil positioned such that when energized, the coil opposes and overwhelms said closing force to open the valve.

4. A valve according to claim 3, further comprising:

pick and hold means for applying an initial strong motivating force to the valve for a predetermined period of time, then lowering the motivating force to a less strong maintaining force.

5. A valve according to claim 3, further comprising a cushion bumper to minimize valve noise.

6. A valve according to claim 3, wherein the piston is cylindrical.

7. A valve according to claim 6, wherein the piston fits loosely within the bore.

8. A valve according to claim 3, wherein the valve body is Delrin.

9. A valve according to claim 3, wherein the piston is aluminum.

10. A valve according to claim 3, wherein the magnet is neodymium.

* * * * *